United States Patent [19]

Tokumo et al.

[11] Patent Number: 4,696,370
[45] Date of Patent: Sep. 29, 1987

[54] HEADREST-MOUNTED ACOUSTIC DEVICE

[75] Inventors: Akio Tokumo; Kazunori Takagi; Shuichi Mori, all of Saitama, Japan

[73] Assignee: Pioneer Electronic Corporation, Tokyo, Japan

[21] Appl. No.: 801,994

[22] Filed: Nov. 25, 1985

[30] Foreign Application Priority Data

Nov. 30, 1984 [JP] Japan .................................. 59-253218

[51] Int. Cl.⁴ .............................................. H05K 5/00
[52] U.S. Cl. ..................................... 181/141; 181/145; 181/155
[58] Field of Search ................ 181/141, 144, 145, 155, 181/156; 381/86

[56] References Cited

U.S. PATENT DOCUMENTS

| | | | |
|---|---|---|---|
| 2,002,390 | 5/1935 | Crosley, Jr. et al. | 181/144 X |
| 2,908,766 | 10/1959 | Taylor | 381/86 X |
| 3,385,393 | 5/1968 | Gold | 181/141 |
| 3,512,605 | 5/1970 | McCorkle | 181/141 |
| 3,944,020 | 3/1976 | Brown | 181/141 |
| 3,987,258 | 10/1976 | Tsutsui et al. | 181/155 X |
| 4,042,791 | 8/1977 | Wiseman | 181/141 X |

Primary Examiner—Benjamin R. Fuller
Attorney, Agent, or Firm—Sughrue, Mion, Zinn, Macpeak, and Seas

[57] ABSTRACT

A headrest-mounted acoustic device including at least a speaker mounted on the right or left side of a headrest provided on a seat, a cover mounted in the sound radiating direction of the speaker, and a sound radiating portion communicating with a chamber provided behind the cover and having an area much smaller than that which is defined by the diameter of the speaker, so that sounds from the speaker are radiated from the sound radiating part through the chamber.

10 Claims, 16 Drawing Figures

HEADREST-MOUNTED ACOUSTIC DEVICE

BACKGROUND OF THE INVENTION

This invention relates to an acoustic device comprising at least one speaker installed in a headrest provided on the top of a seat.

Recently, a variety of acoustic devices each comprising a speaker installed in a headrest provided on the top of a seat have been proposed and commercialized. For instance, Japanese Published Utility Model Application No. 16409/1978 has disclosed an acoustic device in which a speaker is installed on one end of a flexible arm, the other end of which is secured to the arm of a seat or a headrest provided on a seat so that a person sitting on the chair can appreciate music more comfortably than if the person had worn a head receiver such as a headphone. In an acoustic device disclosed in Japanese Published Utility Model Application No. 6059/1984, similarly to the above-described acoustic device, a speaker is set in the vicinity of the listener's ear, and a so-called "driver unit" is installed on the seat, so that the listener can feel extremely low frequency sounds through his body.

In an acoustic device disclosed by Japanese Published Utility Model Application No. 133188/1982, a bracket is secured to a post supporting a headrest, and a speaker is connected to the bracket so as to be positioned beside the headrest, so that the speaker can be directed upwardly or downwardly, or to the right or left. In an acoustic device disclosed by Japanese Published Utility Model Application No. 188486/1982, one end of a pipe supporting a headrest is connected to a chamber behind a loudspeaker, and the other end is passed through the inside of a seat and opened inside the seat, so that low frequency sounds are made significant by a so-called "bass-reflex effect".

Japanese Published Utility Model Application No. 119282/1983 has disclosed a acoustic device in which a speaker is buried in the top of a seat.

However, the above-described acoustic devices disclosed by Japanese Published Utility Model Application Nos. 16409/1978 and 6059/1984 are disadvantageous in that the speaker is located very close to the listener's ear, decreases the listener's field of vision, and may strike the listener if there is an accident. Accordingly, these conventional acoustic devices cannot be used in automobiles or other vehicles.

In the acoustic devices disclosed by Japanese Published Utility Model Application Nos. 133188/1982 and 188486/1982, the speaker is arranged beside the headrest (or obliquely backwards of the listener's ear), that the listener's field of vision is wide, and the danger of accidental injury is lower compared with the two above-mentioned conventional acoustic devices when used in a vehicle. However, there is still the disadvantage that, since the speakers face the listener (or driver), the headrest is wider by the diameters of the right and left loudspeakers, so that the dead angle toward the rear of the automobile is increased as much.

In the acoustic device disclosed in Japanese Published Model Application No. 119282/1983, since the speaker is buried in the top of the seat, the field of vision of the listener will not be obstructed and the dead angle will not be increased. However, the acoustic device is disadvantageous in that the speaker faces upwardly. Therefore, because of the directional pattern of the loudspeaker, and more specifically because of the relationship between the direction of the main axis of the speaker and the position of the listener's ear, it is difficult to obtain a flat sound transmission characteristic. Furthermore, when the listener's head is moved, frequency response varies greatly because of the directional pattern.

SUMMARY OF THE INVENTION

Accordingly, an object of this invention is to eliminate the above-described difficulties accompanying a conventional acoustic device in which a speaker is installed on a headrest provided on the top of seat.

The foregoing object and other objects have been achieved by an inventive acoustic device comprising: a speaker mounted on one of the right and left sides of a headrest provided on the top of a seat, a cover mounted in the sound radiating direction of the speaker, the cover forming a chamber with the speaker; and a sound radiating part which is communicated with the chamber and has an area much smaller than an area which is defined by the diameter of the speaker, sounds produced by the speaker being transmitted through the chamber and radiated through the sound radiating part.

BRIEF DESCRIPTION OF THE DRAWINGS

The nature, principle and utility of the invention will become more apparent from the following detailed description when read in conjunction with the accompanying drawings in which.

DETAILED DESCRIPTION OF THE PREFERRED EMBODIMENT

Figure 1:
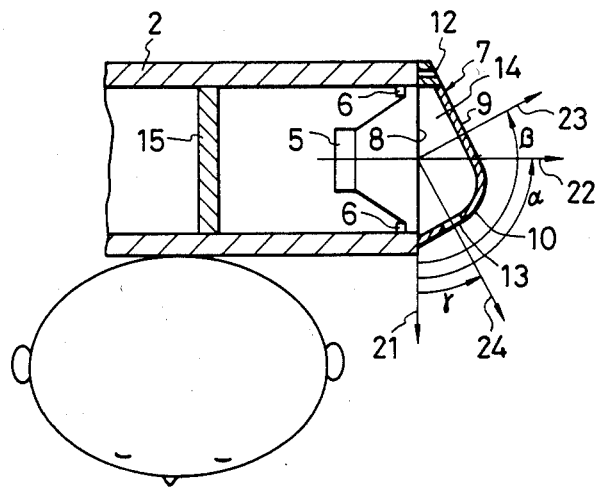
FIG. 1 is a sectional view showing one example of an acoustic device according to this invention.
Figure 2:
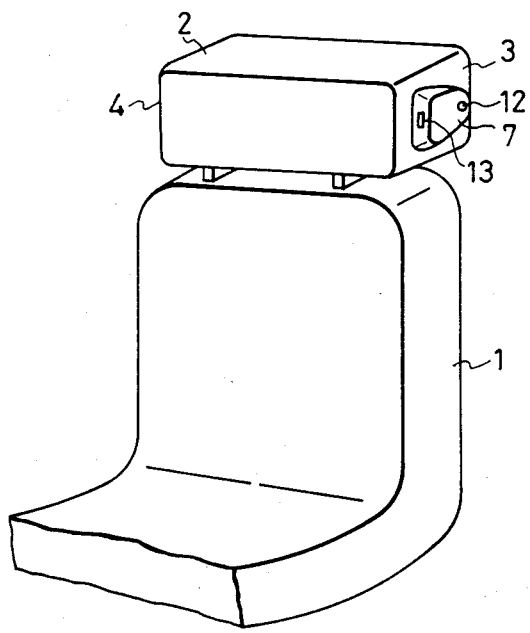
FIG. 2 is a perspective view of the acoustic device.
Figure 3:
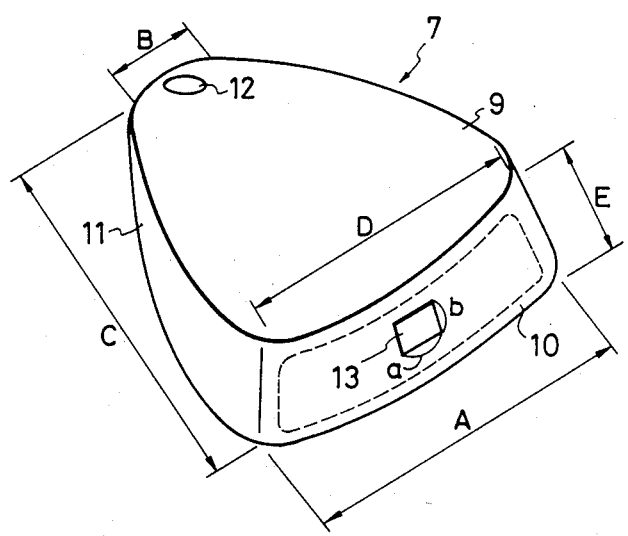
FIG. 3 is a perspective view of a cover of the acoustic device.

FIGS. 1 through 3 show the arrangement of an acoustic device according to the invention as used in an automotive or other vehicle seat.

In these Figures, reference number 1 designates, for example, a car seat. A headrest 2 is provided on the seat 1. Speakers 5 are mounted inside the right and left sides 3 and 4 of the headrest 2 so that their sound radiating directions are substantially horizontal (only one speaker 5 being shown). Further in FIGS. 1 through 3, reference numeral 6 designates mounting parts on which the speaker is mounted with screws (not shown) or the like; and 7, a cover made of a steel plate the inside or outside of which is covered with foamed resin, the cover 7 comprising an opening 8 at the bottom, a reflecting surface 9 forming a predetermined angle with the bottom on which the opening 8 is formed, a front surface 10 having one edge connected to the reflecting surface 9 and the other edge forming part of the opening, and side surfaces 11 which are extended on both sides of the reflecting surface 9 and the front surface 10; 12, a hole into which a screw (not shown) or the like is inserted for securing the cover 7 to the headrest 2; and 13, a sound radiating part provided in the front surface 10, and having a relatively small number of holes (one hole in FIG. 3). The hole is rectangular in FIG. 3; however, it may be circular or elliptic. The sound radiating part 13 may be covered with a net (not shown) or the like. Of course, if desired, the net may cover an area in the front surface 10 larger than the sound radiating part 13.

The reflecting surface 9, the front surface 10, and the side surfaces 11 form a chamber 14 which communicates with the opening 8, and with the sound radiating part 13. The space in the headrest 2 which is defined by the speakers 5 is a closed chamber similarly as in the usual speaker cabinet. In the headrest 2, there are two partition boards 15 between the loudspeakers 5. The partition boards 15 are used to prevent the mutual interference of the right and left loudspeakers 5. Therefore, the partition boards 15 may be provided on the loudspeakers 5, respectively. Alternatively, the partition boards 15 may be replaced by discontinuous foamed urethane provided between the speakers.

The operating of the acoustic device thus constructed will be described.

A sound signal generated by a sound source such as a car stereo set or car radio set is supplied to the right and left speakers 5, which output sound. The sound produced by each speaker 5 is reflected by the reflecting surface 9 of the cover 7, thus reaching the listener's ears through the sound radiating part 13. That is, since the chamber 14 is small in volume, its compliance is small, and therefore variations in pressure in the chamber 14 are radiated through the sound radiating part 13 according to the movement of the diaphragm of the speaker 5. The sound pressure behind one speaker 5 is not transmitted to the other speaker because of the presence of the partition boards 15, so that the speakers 5 do not interfere with each other.

In FIG. 1, the arrow 21 indicates the direction of the front of the seat; the arrow 22, the speaker's sound radiating direction; the arrow 23, the direction of the normal to the reflecting surface 9; and the arrow 24, the direction of the normal to the front surface 10. The angle α between the arrows 21 and 22 is about 90°. In the acoustic device, each speaker 5 is so installed that the sound radiating direction 22 is substantially parallel to the central axis of the headrest 2, and therefore the angle α is the angle of the headrest 2 with respect to the chair 1. Accordingly, the angle α can be determined from the original function of the headrest 2, and therefore the angle α is somewhat acute in the case where the headrest 2 is more or less curved towards the listener. On the other hand, the angle β between the arrow 23 indicating the normal to the reflecting surface 9 and the arrow 21 of the front of the seat 1 is obtuse, so that a sound from the speaker 5 is reflected towards the front surface 10. The angle between the arrow 24 of the normal to the front surface 10 and the arrow 21 pointing toward the front of the seat 1 is acute, so that the sound is transmitted towards the listener's ear. For convenience in description, in the above-described embodiment the surfaces of the cover 7 are flat; however, they also may be slightly curved.

For instance in the case where speakers 5 are 87 mm in diameter (having an area of about 59 cm$^2$ as viewed in the sound radiating direction) are used, the opening 8 of the cover 7 for each speaker may be in the form of a trapezoid 125 mm in long side A, 35 mm in short side B, and 100 mm in height C (FIG. 3), and the front surface 10 may be substantially in the form of a trapezoid 125 mm in long side A, 90 mm in short side D and 55 mm in height E, so that the chamber 14 has a volume of about 150 cm$^3$). If the sound radiating direction of the speaker 5 is extended directly toward the listener's ear, then the cover will extend about 90 mm or more to the right and left; however, in the above-described case, the cover is extended only about 55 mm.

Figure 4:
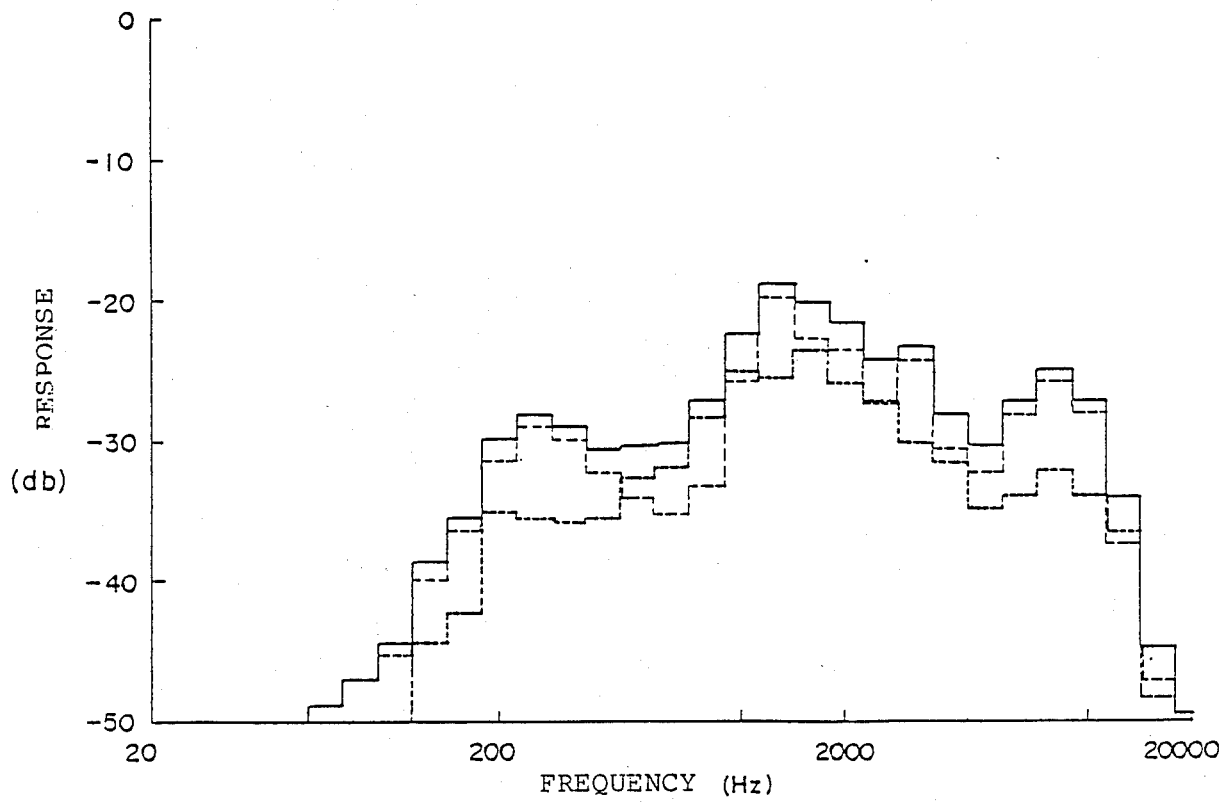
FIG. 4 is a graph indicating frequency response of the acoustic device which has its cover removed.

FIG. 4 shows the frequency response of an acoustic device in the case where the covers 7 are removed and the frequency is successively changed at intervals of ⅓ octave. The dotted line indicates the left channel signal, the broken line indicates the right channel signal, and the solid line indicates the effective average value of the two signals (this designation being applied to the remaining frequency characteristic diagrams). It is considered that the difference between the right and left channel signals is attributable to a door (or window glass) adjacent to one of the right and left speakers.

Figure 5:
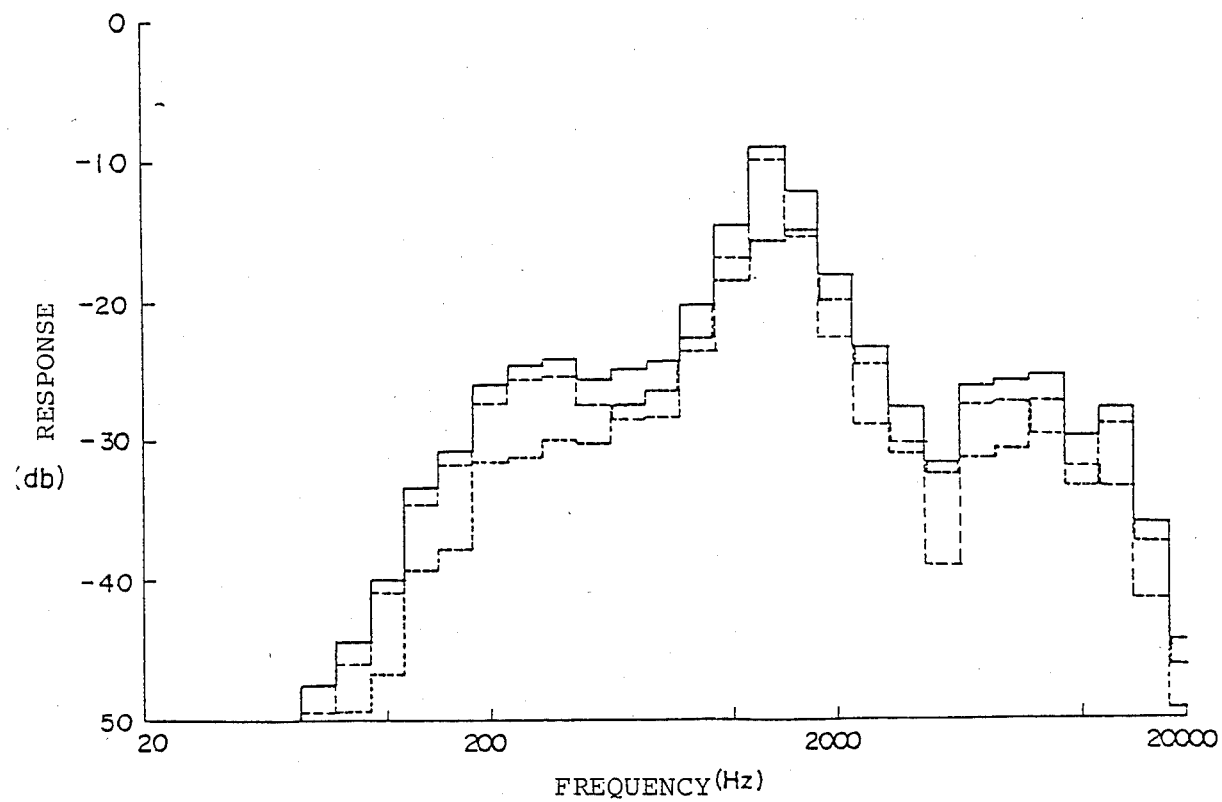
FIG. 5 is a graph indicating frequency response of the acoustic device in which a sound radiating part of the cover is made larger.

FIG. 5 shows the frequency response characteristic of an acoustic device having covers 7 in each of which the sound radiating part 13 is relatively larger, about a half (about 30 cm$^2$) of the front surface 10 (about 59 cm$^2$), as indicated by the dotted line in FIG. 3, and the sound radiating part 13 is covered with a mesh having a number of small holes. As is apparent from FIG. 5, when such covers 7 are installed, a peak occurs at about 1000 Hz. In practical experiments, it was found that the reproduced sounds were not of high fidelity.

Figure 6:
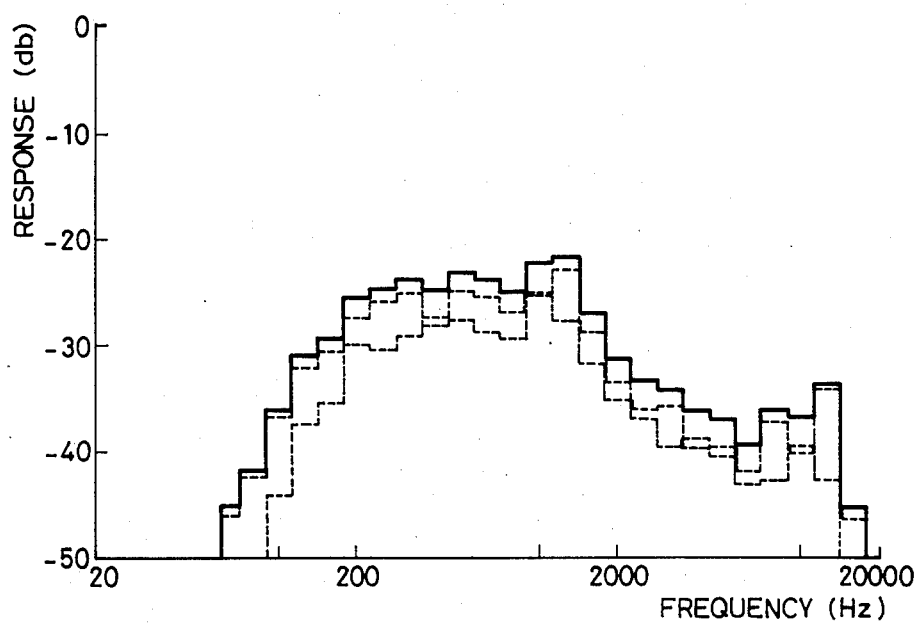
FIG. 6 is a graph indicating frequency response of the acoustic device in which the sound radiation part is in the form of a square measuring 13 mm × 13 mm.

FIG. 6 shows the frequency response of an acoustic device having covers 7 in each of which the sound radiating part 13 is made relatively small in area a indicated by the solid line in FIG. 3, and one substantially square hole 13 mm in each side (its area being about 2.9% of the front surface 10 or the speaker 5) is formed in the sound radiating part 13. In the acoustic device, the peak near 1000 Hz is eliminated from the graph.

Figure 7:
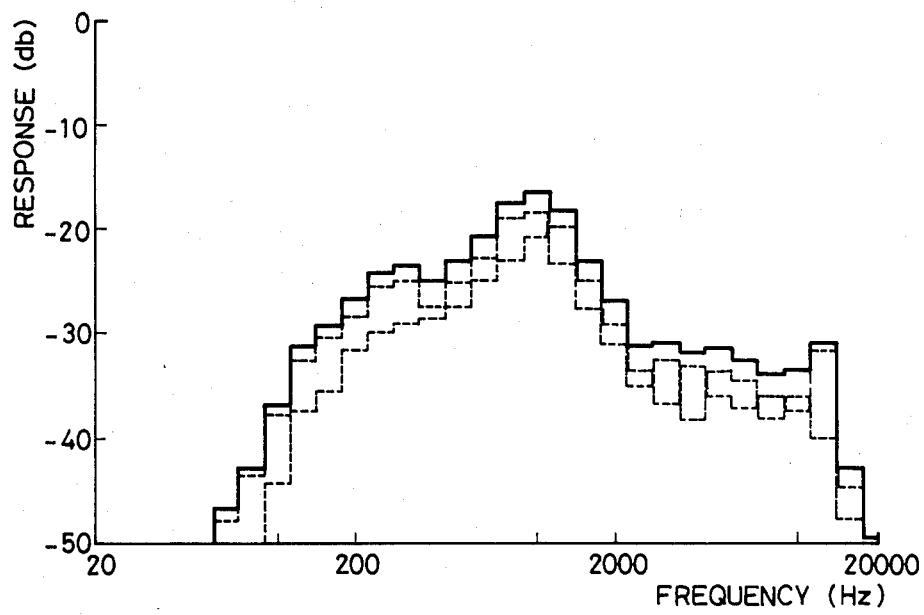
FIG. 7 is a graph indicating frequency response of the acoustic device in which the sound radiation part is 13 mm wide and 13 mm long.

FIG. 7 shows the frequency response of an acoustic device in which a hole 13 mm in width (a) and 30 mm in length (b) (its area being about 6.6% of the front surface 10 or speaker 5) is formed in each sound radiating part. In this case, a peak appears in the graph, although the peak is smaller than that in FIG. 5 but somewhat larger than that in FIG. 6.

Figure 8:
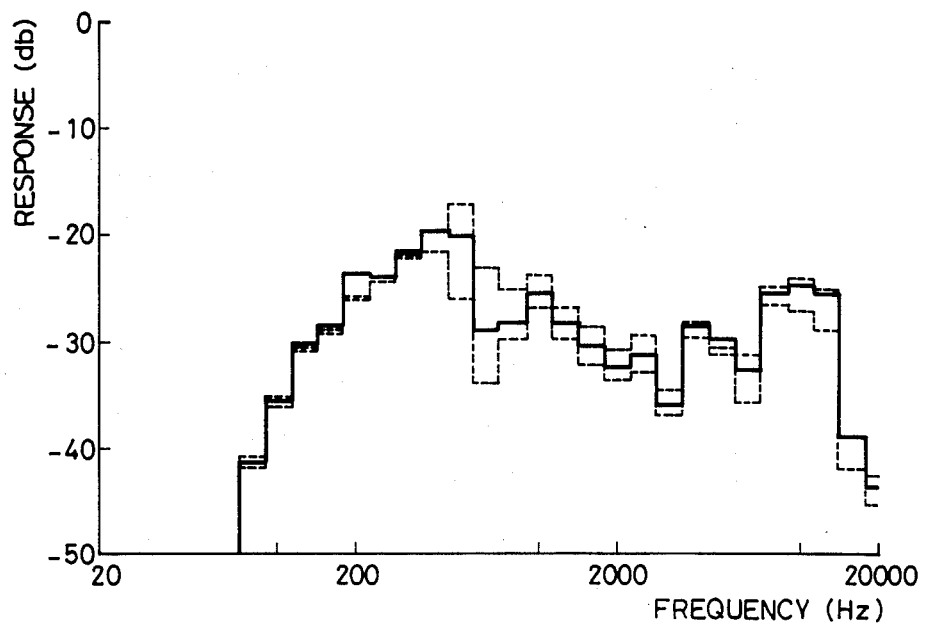
FIG. 8 is a graph indicating respective frequency responses of the acoustic devices having a sound radiating part 134 mm wide and have lengths of 8 mm, 13 mm and 30 mm.

FIG. 8 shows the frequency response of the acoustic device in which the hole formed in each sound radiating part is 13 mm wide, but 8 mm long (dotted line), 13 mm (solid line) and 20 mm (broken line) (the area being about 1.7%, about 2.9% and about 4.4% of that of the front surface 10 or speaker 5, respectively). As is apparent from FIG. 8, a peak is liable to occur with the length set to 20 mm.

Figure 9:
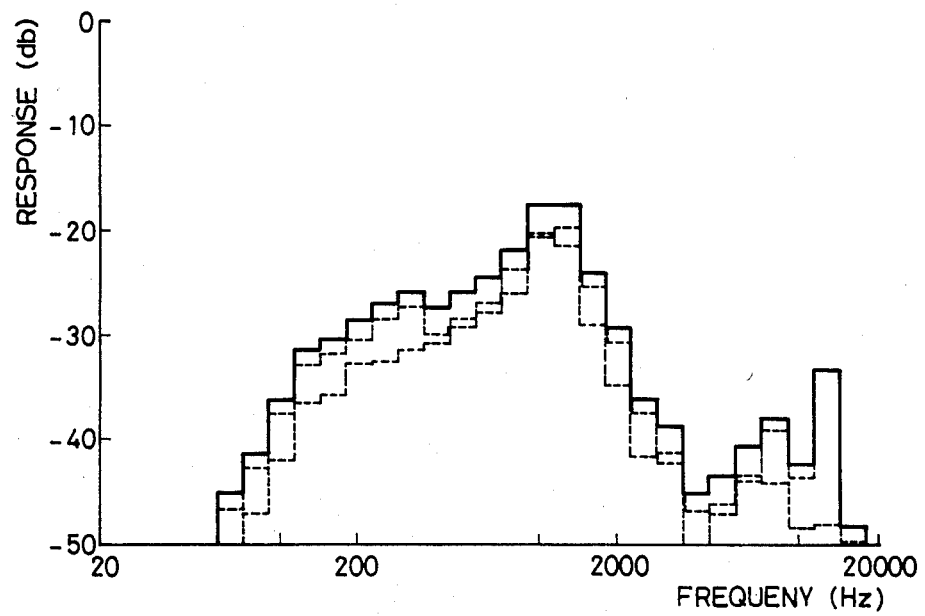
FIG. 9 is a graph indicating frequency response of the acoustic device in which a chamber provided behind the cover has a volume of 100 $cm^3$.

FIG. 9 shows the frequency response of the acoustic device in which the hole formed in each sound radiating part is substantially in the form of a square 13 mm×13 mm and the volume of each chamber 14 is set to about 100 cm$^3$. In this case, a peak occurs in the graph, although it is relatively small.

Figure 10:
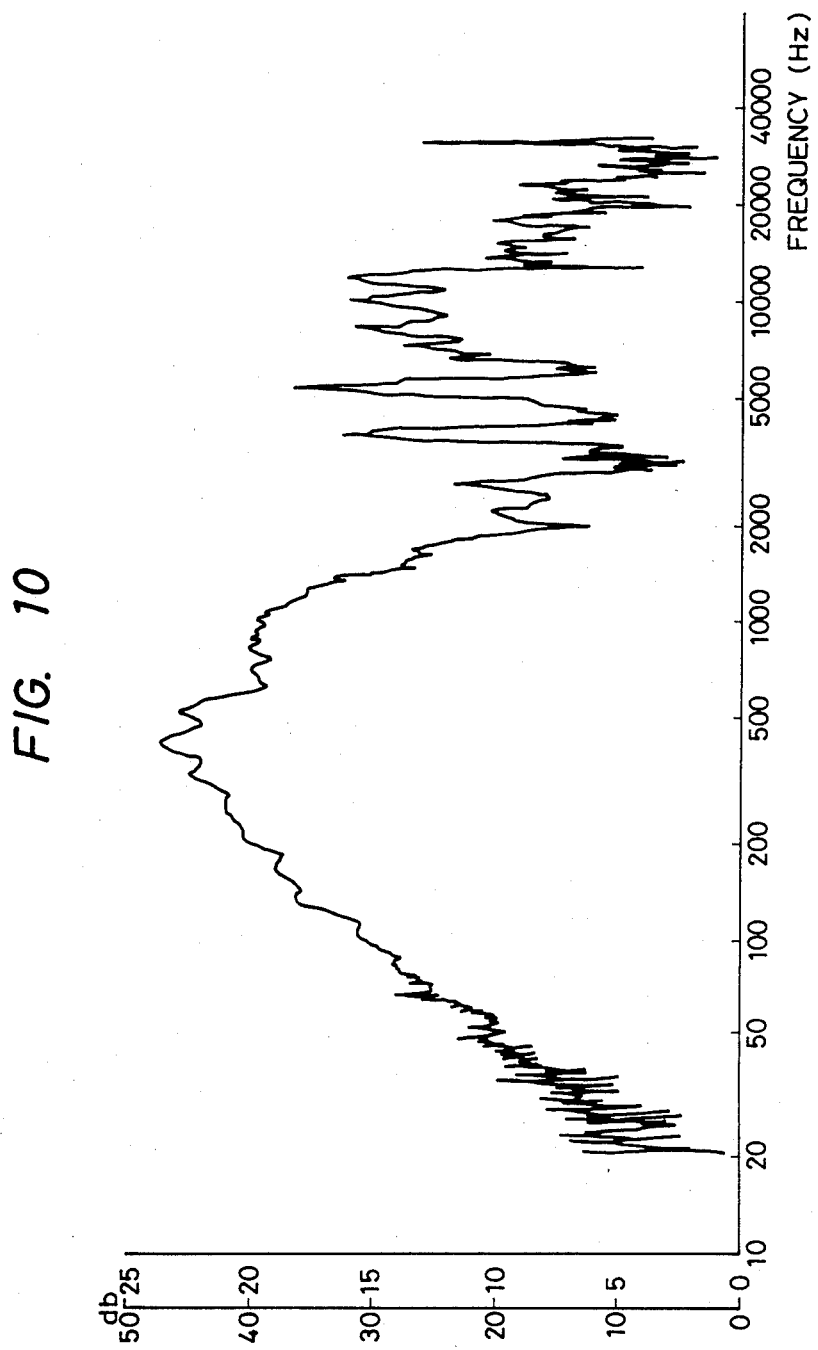
FIG. 10 is a graph indicating frequency response of the acoustic device in the direction of the normal to the the front surface of the cover.
Figure 11:
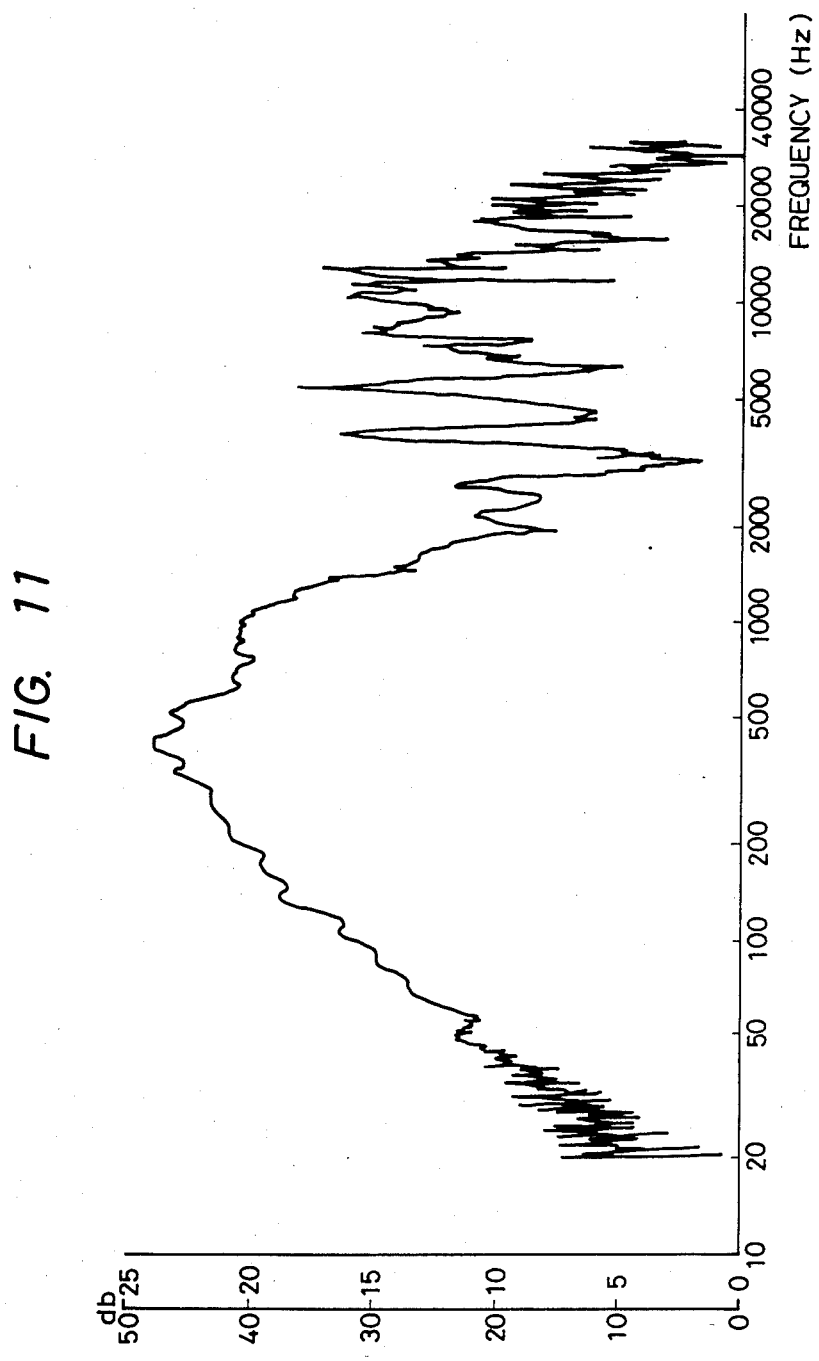
FIG. 11 is a graph indicating frequency response of the acoustic device in a direction of 22.5 degrees with respect to the normal.
Figure 12:
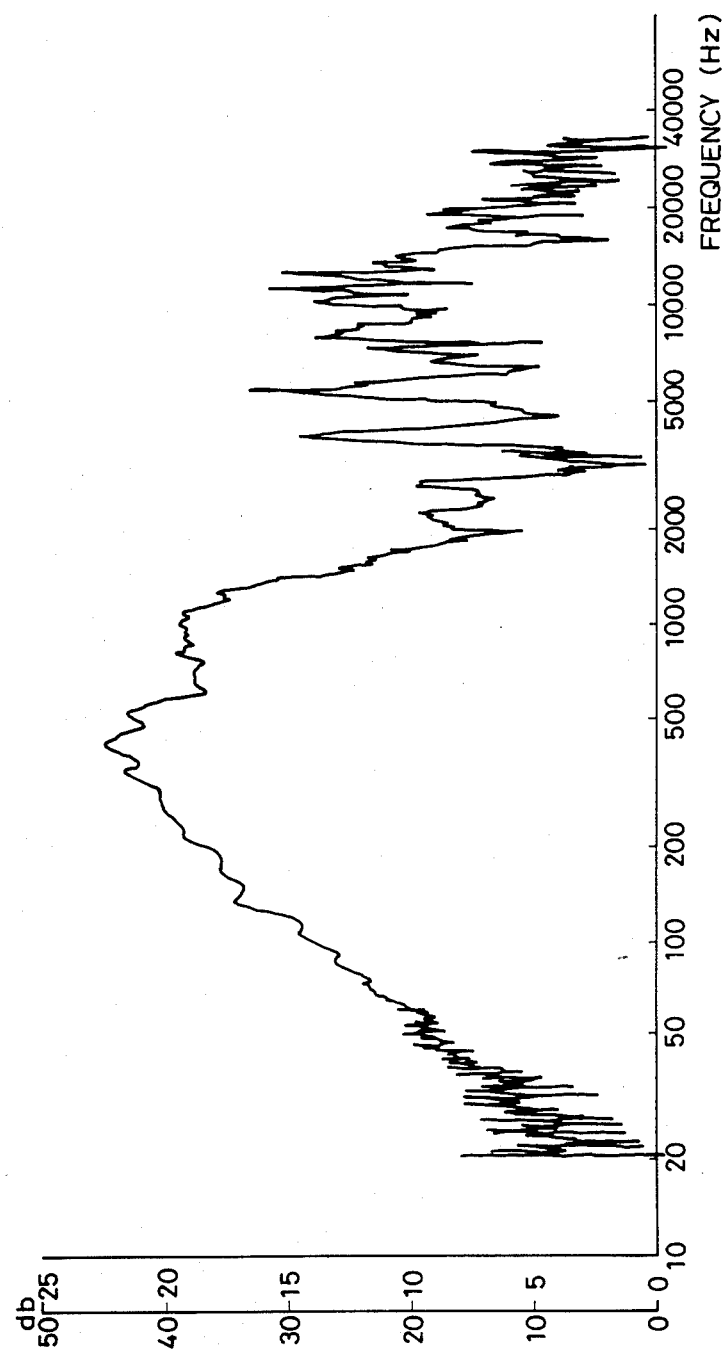
FIG. 12 is a graph indicating frequency response of the acoustic device in a direction of 45 degrees with respect to the normal.

FIGS. 10, 11 and 12 show the frequency response of the acoustic device in the respective cases where frequency is changed in an analog mode in the direction of 0°, 22.5° and 44.5° with respect to the arrow 24 of the normal to the front surface 10. It is apparent from FIGS. 10, 11 and 12 that the frequency responses measured in these directions are not so different from one another; that is, that the acoustic device is non-directional.

At present, it is not known why no peak occurs in the middle frequency sound range with the acoustic device, and why the frequency response is non-directional. However, it can be considere through the above-described experiments that the facts depend at least on the area of the diaphragm of each speaker 5 or the area of the front surface 10 of each cover 7, or the size of the sound radiating part 13 with respect to the volume of the chamber 14. It is also considered that it becomes impossible to substantially eliminate the peak when the area of the sound radiating part 13 is at least 10% of the area of the front surface 10 of the cover 7.

FIGS. 13 through 16 shows other examples of the acoustic device according to the invention.

Figure 13:
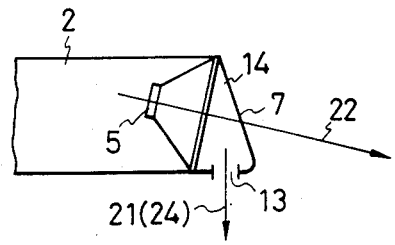
FIGS. 13 through 16 are explanatory diagrams showing other examples of the acoustic device according to the invention.

In the acoustic device shown in FIG. 13, the arrow 21 of the front of the chair is parallel to the arrow 24 (indicating the direction of the sound radiating part 13) of the front surface 10 in each cover 7, and each speaker 5 is fixedly mounted in such a manner that the arrow 22 indicating sound radiating direction is inclined with respect to the axis of the headrest 2. Therefore, in the acoustic device, the arrow 21 of the front of the chair and the arrow 22 indicating sound radiating direction form an acute angle.

Figure 14:
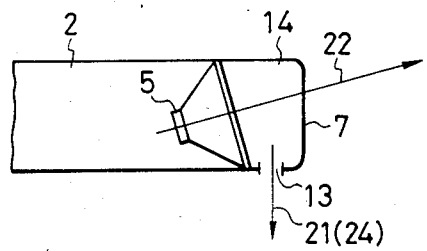

On the other hand, in the acoustic device shown in FIG. 14, each speaker 5 is fixedly mounted in the headrest 2 in such a manner that the arrows 21 and 22 form an obtuse angle.

Figure 15:
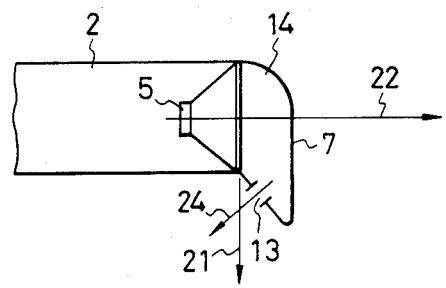

In the acoustic device shown in FIG. 15, each cover 7 is slightly protruded forwardly of the headrest 2, and the arrow 24 of the front surface is laid inwardly of the headrest 2.

Figure 16:
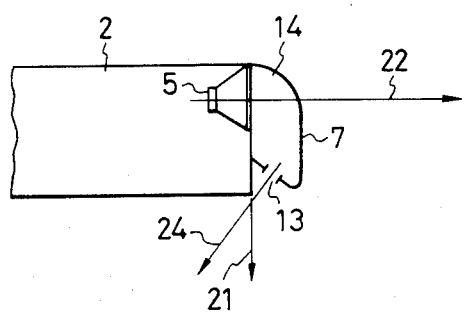

In the acoustic device shown in FIG. 16, each cover 7 is not protruded forwardly of the headrest 2, but the arrow 24 of the front surface is laid inwardly of the headrest 2.

These examples of the acoustic device shown in FIGS. 13 through 16 are inferior to the example shown in FIG. 1 in that the covers protrude more to the right and left of the headrest in the former examples than those in the latter example; however, in these embodiments, the peak is eliminated in the middle frequencies, and the frequency response is non-directional. Consequently, if each sound radiating part 13 is near the listener's ear, the sound radiating direction of the speaker 5 can be inclined in a desired direction (e.g., the sound radiating direction can be inclined by a predetermined angle in an upward direction or downward direction).

In addition, the position of the sound radiating part 13 relative to the speaker 5 can be optimally determined. The sound radiating part 13 may be in the form of a pipe so that its direction can be changed freely. In the above-described embodiments of the invention, the headrest 2 has two speakers 5 and two sound radiating parts 13; however, it may have one speaker and one sound radiating part. Furthermore, the acoustic device may be so modified that sounds from one speaker are transmitted to two (right and left) sound radiating parts.

As is apparent from the above description, in the acoustic device of the invention, the speaker is fixedly secured to a side of the headrest in such a manner that the speaker faces sidewards, and sound from the speaker is reflected towards the listener. Therefore, the acoustic device provided by the invention will never decrease the listener's field of vision and is excellent in acoustic characteristic. Furthermore, because of the sufficiently small sound radiating part, no peak occurs in middle frequencies which is the most important sound rang in high fidelity sound reproduction, and the frequency response of the acoustic device is non-directional.

We claim:

1. An acoustic device comprising:
   a headrest having at least a first hollow inner portion at a side portion thereof, said headrest being mounted on top of a seat;
   at least a first speaker mounted within said first hollow portion of said headrest, a sound radiating direction of said speaker being substantially parallel to the central axis of said headrest;
   a cover mounted outside said headrest in the sound radiating direction of said first speaker, said cover having a front surface, side surfaces, and reflecting surface, said surfaces being so connected as to form a chamber with said first speaker, said front surface having an axis of orientation which is at an angle other than normal to said sound radiating direction; and
   a sound radiating part for altering a frequency response characteristic of said first speaker, said sound radiating part being constituted by an opening in said front surface and having an area substantially smaller than an area which is defined by the diameter of said speaker, said frequency response charcteristic being altered in accordance with the area of said sound radiating part.

2. An acoustic device as claimed in claim 1, wherein the sound radiating direction of said speaker is substantially horizontal and is to the right or left of the front direction of said chair.

3. An acoustic device as claimed in claim 1, wherein the area of said sound radiating part is at most 10% of the area which is defined by the diameter of said speaker.

4. An acoustic device as claimed in claim 1, wherein the area of said sound radiating part is at most 5% of the area defined by the diameter of said speaker.

5. An acoustic device as claimed in claim 3, wherein said sound radiating part has a plurality of holes.

6. An acoustic device as claimed in claim 3, wherein said sound radiating part has one hole.

7. An acoustic device as claimed in claim 1, wherein said seat is installed in a vehicle.

8. An acoustic device as claimed in claim 1, wherein said headrest has a second hollow inner portion on a side of said headrest opposite said first hollow inner portion, said acoustic device further comprising a second speaker mounted opposite said first speaker within said second hollow inner portion, and interference preventing means provided between said first and second speakers to prevent said two speakers from interfering with each other.

9. An acoustic device as claimed in claim 7, wherein said interference preventing means are provided in said headrest.

10. An acoustic device as claimed in claim 8, wherein said interference preventing means comprises two partition boards.

* * * * *